United States Patent
Munz-Schaerer et al.

(10) Patent No.: US 6,548,098 B1
(45) Date of Patent: Apr. 15, 2003

(54) LIQUID STERILIZED FOOD COMPOSITION AND PROCESS FOR MAKING SAME

(75) Inventors: Daniela Doris Munz-Schaerer, Konolfingen (CH); Rolf Jost, Bolligen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/525,003

(22) Filed: Mar. 14, 2000

(30) Foreign Application Priority Data

Mar. 16, 1999 (EP) .............................. 99105359

(51) Int. Cl.$^7$ ............................. A23L 1/187
(52) U.S. Cl. ................ 426/579; 426/583; 426/586
(58) Field of Search ....................... 426/569, 565, 426/590, 592, 566, 584, 567, 579, 583, 586

(56) References Cited

U.S. PATENT DOCUMENTS

| | | | |
|---|---|---|---|
| 4,906,489 A | 3/1990 | Flango, Jr. et al. | 426/579 |
| 4,931,302 A * | 6/1990 | Leshik et al. | 426/548 |
| 4,988,529 A * | 1/1991 | Nakaya et al. | 426/569 |
| 5,360,625 A | 11/1994 | Sikking et al. | 426/573 |

FOREIGN PATENT DOCUMENTS

| | | |
|---|---|---|
| EP | 0 186 233 | 7/1986 |
| EP | 0 616 774 A1 | 9/1994 |
| EP | 0 795 276 A1 | 9/1997 |
| EP | 0 820 704 A1 | 1/1998 |
| GB | 2 166 337 A | 5/1997 |

OTHER PUBLICATIONS

Database WPI, Section Ch, Week 9510, Derwent Publications Ltd., London, GB; AN 95–069246, XP002112589 & JP 06343397 A (Fugetsudo Honten YG), Dec. 20, 1994 *abstract* & Patent Abstracts of Japan, vol. 95, No. 3, Apr. 28, 1995 & JP 06 343397A *abstract*.
Patent Abstracts of Japan, vol. 013, No. 174 (C–589), Apr. 25, 1989 & JP 01 005464 A (Meiji Milk Prod. Co. Ltd.), Jan. 10, 1989 *abstract*—& Derwent Publications Ltd., London, GB; AN 89–049869, XP002112590 *abstract*.

* cited by examiner

*Primary Examiner*—Nina Bhat
(74) *Attorney, Agent, or Firm*—Winston & Strawn

(57) ABSTRACT

The present invention relates to liquid, sterilized food compositions including about 20 to 45% by weight of a milk, between about 10 to 20% by weight of egg, between about 10 to 20% by weight of cream, between about 15 to 30% by weight of a sugar, and whey protein in an amount of about 4 to 10% by weight, wherein the compositions are suitable for making heat-set gelled food products. The invention also relates to a process for making such compositions by preparing an acid phase of an acid, the whey protein and water; preparing a neutral phase of the milk, sugar, egg and cream components; sterilizing the acid phase and neutral phase separately from one another; and then combining the sterilized acid phase and the sterilized neutral phase to obtain the compositions.

20 Claims, No Drawings

LIQUID STERILIZED FOOD COMPOSITION AND PROCESS FOR MAKING SAME

FIELD OF THE INVENTION

The present invention relates to liquid, sterilized food compositions containing milk, egg, cream and sugar, which compositions are suitable for making various heat-set gelled products such as puddings and custards.

BACKGROUND ART

Heat-set gelled products such as puddings are known in the art. One method for making a heat-set gelled product comprises mixing one volume of sweetened condensed milk with two volumes of milk and three eggs. The ingredients are then mixed well and baked according to a conventional oven heat treatment. The eggs lead to gel formation during the oven heat treatment. After cooling, a nice, well shaped pudding results.

During a high heat treatment, however, functional properties of the egg such as the gelation property are lost, which complicates production of ready to use food compositions that must be subjected to an ultra-high temperature (UHT) treatment. For example, European Patent Application no. 0,186,233 discloses a pudding-like ready to eat dessert product wherein a whey protein concentrate obtained by ultra filtration is subjected to a denaturation treatment followed by homogenization and, subsequently, other classical ingredients are added and the composition is heat treated to obtain the pudding. This method, however, undesirably requires the addition of thickening agents, such as starch and gelatin, to obtain the required gelling effect. European Patent Application no. 0,820,704 discloses an egg-based product which has the ability to emulsify and to expand and gel on cooking. The method of making the disclosed product is based on the presence of casein and calcium, which allows the gelation by heat-treatment. The presence of calcium, however, leads to the undesirable formation of an unpleasant taste, which is unacceptable to consumers.

Thus, there is a need for a ready to use food composition, which has a long shelf life, can be prepared when desired by a consumer, has excellent heat-set gelling properties using a classical oven heat-treatment, does not require added thickeners such as starch or gelatin, and does not have an unpleasant taste.

SUMMARY OF THE INVENTION

The invention relates a liquid, sterilized food composition consisting essentially of about 20 to 45% by weight of a milk, between about 10 to 20% by weight of egg, between about 10 to 20% by weight of cream, between about 15 to 30% by weight of a sugar, and whey protein in an amount of about 4 to 10% by weight, wherein the composition is suitable for making heat-set gelled food products. Preferably, at least 10% by weight of the milk is skim milk, and the whey protein represents about 30 to 60% of the total protein.

Generally, the composition has a pH of between about 5 and 6 and includes a sweetener. Preferably, the pH is between about 5.4 and 5.8 and the sweetener is a carbohydrate. Typical sweeteners are sucrose, lactose, maltodextrins, starch, or a combination thereof. The composition also has a typical solids content of between about 30 to 40%.

Another embodiment of the invention relates to a method for preparing these liquid, sterilized food compositions. The method includes the steps of preparing an acid phase comprising an acid, the whey protein and water; preparing a neutral phase comprising a mixture of the milk, sugar, egg and cream components; sterilizing the acid phase and neutral phase separately from one another; and combining the sterilized acid phase and the sterilized neutral phase to obtain the composition.

Preferably, the acid phase is prepared to have a pH of between about 2 and 5. Also, at least one of skim milk powder, an alternative source of milk protein, or a combination thereof is added to the neutral phase as part of the milk component. The acid phase and the neutral phase are separately sterilized using typical sterilization temperatures in the range of about 135 to 150° C. and at typical holding times of between about 2 and 20 sec. The sterilized acid and neutral phases are then aseptically combined and packaged. Generally, the acid and neutral phases are combined in a mass ratio of the acid phase to the neutral phase of between about 1:1 and 1:2.5.

DETAILED DESCRIPTION OF THE PREFERRED EMBODIMENT

The present invention relates to a ready to use food compositions, which have excellent heat-set gelling properties using a classical oven heat-treatment, and do not have an unpleasant taste. Heat-set gelled compositions or products according to the present invention include, for example, any type of pudding including whipped puddings, custards, and pudding mixes. The sterilized food compositions according to the invention typically have a shelf life exceeding 6 months and can be preserved at room temperature for between 6 and 12 months. These compositions are preferably packed in, for example, a UHT-carton and opened when the consumer wants to prepare the pudding or custard corresponding to the composition therein. Typical conditions for preparation of the pudding or custard include, for example, cooking at an oven temperature of around 180° C. in a water bath for 1.5 hours. Other specific times and temperatures are known by one of ordinary skill in the art or can be determined by routine experimentation.

In one embodiment, the present invention relates to liquid, sterilized food compositions such as, for example, a ready to use pudding or custard mix. These compositions typically contain from about 4 to 10% whey proteins, up to 15% fats, and up to 40% carbohydrates, the remainder being minerals and water. In a more preferred embodiment the composition comprises about 6% fats, about 22% carbohydrates, about 7% proteins, the remaining being minerals (about 1%) and water. In this description, all percentages are based on weight unless otherwise noted.

In a preferred embodiment, about 40% of the total protein comprises whey protein with a most preferred whey protein content being about 4 to 7%. The other proteins are typically proteins from egg such as, for example, whole egg or egg yolk or proteins from milk sources such as, for example, non fat milk solids, or any combination thereof.

As described above, the compositions of the present invention are ready to use and have a long shelf life because they are heat treated. As known in the art, however, heat sterilization leads to a loss of the gelling properties of the proteins of the eggs, but not, however, of their favorable taste properties. It is further known that although whey protein has gelation properties, such functional properties of whey are also lost during a normal heat treatment. In order to preserve the gelation properties of whey protein, the heat-treatment must be carried out at an acid pH. It is not possible, however, to carry out the heat-treatment of milk at a low pH. Thus, a preferred embodiment of the present invention comprises separately heat-treating an acid whey protein phase and a neutral phase comprising milk and egg. Thus, the lost gelling properties of the egg are replaced by the gelling properties of sterilized whey protein and the resulting composition does not require the addition of thickeners such as, for example, starch or gelatin.

The acid phase preferably includes the whey protein. The acid phase may, optionally, include a sweetener in the form of a carbohydrate such as, for example, sucrose or lactose, although maltodextrins, starch, other carbohydrates, or any combination of carbohydrates may also be used. Mineral acids such as, for example, phosphoric acid, sulfuric acid, hydrochloric acid, or combination thereof may be used to adjust pH.

This acid phase is preferably prepared having a pH between about 2 and 5, and more preferably with a pH of between about 2.5 to 3.5. Preferably, the acid phase is prepared using water. The whey protein preferably comprises at least one acid whey such as, for example, casein whey, but other whey protein sources, or a combination of whey proteins can be used. The amount of whey protein included in the acid phase is preferably between about 4 and 10% of the total amount of the composition.

Normally, increasing the whey protein content of the composition correspondingly increases the firmness of the gel of the oven-cooked dessert. Whey protein contents higher than 7%, however, lead to cheese-like textures or flavors, which are not well perceived in dessert products. Thus, it is preferred to use a maximum of about 7% of the whey protein in the inventive compositions.

The advantage of using whey protein produced from acid whey is that less acid is required to adjust the pH of the acid phase. The preferred acid for adjustment of pH is a mineral acid such as phosphoric acid, although other mineral acids such as sulfuric acid, hydrochloric acid, or a combination of these acids may instead be used.

The presence of carbohydrates is important for obtaining a sweetening effect. The use of and type of carbohydrates, however, is not critical. For example, the acid phase may optionally contain a carbohydrate such as, for example, sucrose, lactose, or various combinations thereof. Maltodextrins or other carbohydrates may also be used. The amount of carbohydrate in the acid phase is normally between about 0.1 and 10%. While starch can be used for a sweetening effect, starch or other thickeners such as gelatin are not required for the gelation properties or for gelling of the present food compositions. Thus, the amount of starch would be that which is effective to provide sweetening but less than that which would cause gelation.

The neutral phase is preferably made of a mixture of up to about 20% egg, up to about 40% skim milk, up to about 25% of cream and up to about 30% of sugar. In a preferred embodiment, the neutral phase comprises between about 20 to 35 and preferably about 28% of skim milk, between about 10 to 20 and preferably about 16% egg, between about 10 to 20 and preferably about 16% of cream and between about 15 to 30 and preferably about 22% of sugar. It is also possible to add a certain amount of skim milk powder or another milk protein source to the neutral phase. The content of this last ingredient is up to about 10%, generally between about 5 and 10 and preferably about 7%. This amount would be in addition to the amount of skim milk and would result in a total amount of skim milk of between about 30 and 45%.

As mentioned above, both phases must be sterilized separately. This sterilization is preferably an UHT treatment, i.e., a heat treatment in a temperature range of about 135 to 150° C. with holding times in the range of about 2 to 20 sec. The preferred mode of heating is by steam injection. After the sterilization, the neutral phase is homogenized.

After cooling, both phases are combined. The filling is carried out in an aseptic filling system at a ratio of the acid phase to the neutral phase of between about 1:1 and 1:2.5. The most preferred acid phase to neutral phase ratio is preferably about 1:1.5.

EXAMPLES

To illustrate the present invention, the following non-limiting examples of compositions and processes are presented.

Example 1

An acid phase was prepared by dispersing 67 g/kg of acid whey protein concentrate (a protein content of 80% of solids) in water and correcting the pH from an initial value of 4 to 3.5 by the addition of dilute phosphoric acid.

A neutral phase was prepared by mixing 215 g/kg of cream (38% fat) with 180 g/kg of skim milk, 50 g/kg of powdered milk protein concentrate (60% protein solids), 97 g/kg of skim milk powder, 268 g/kg of crystalline sucrose and 187 g/kg of liquid whole egg.

The sterilization of each phase was carried out in the same way. The product was pre-heated on a plate heat exchanger to 80° C. and then UHT heated by steam injection to 148° C., for a holding time of 5 sec. The phases were flash cooled to 78° C. and, prior to final cooling, to about 4° C., the neutral phase only was homogenized. Both sterilized phases were pumped to and combined in a sterile tank and from there pumped to an aseptic filling line, to be packaged in TETRABRIKS™ machine (Tetra Laval Holdings & Finance S.A., Pully, Switzerland), which are then sealed. The weight ratio the acid phase to the neutral phase was in this case 1:1.6.

The sterile liquid product had the following approximate composition: protein 8.2%, fat 5.7%, carbohydrates 21.8% and ash 1%; and a total solids content of 36.8%. Whey protein in the product accounted for about 34% of the total protein (including egg protein).

The resultant composition can be preserved at ambient temperature for at least 6 months. When the content of the package is cooked in an oven at 180° C. for 30 min and then cooled in a refrigerator, a pudding with nice texture properties and pleasant taste is obtained.

Example 2

An acid phase was produced by dispersing 90 g/kg of acid whey protein concentrate (80% protein solids) in water; the resulting pH was 3.8. Dilute phosphoric acid was used to adjust the pH to 3. This acid phase was UHT sterilized at 148° C. for 5 sec.

A neutral phase was produced by mixing 280 g/kg of skim milk with 160 g/kg cream and 190 g/kg of liquid whole egg. 275 g/kg of crystalline sucrose and 94 g/kg of skim milk powder were dissolved in this mixture, which, after appropriate dissolution of the solids, was subjected to UHT-sterilization performed under the same conditions as for the acid phase. The neutral phase was also subjected to a homogenization step.

The acid and neutral phases were mixed at a mass ratio of 1:1.5. The final, sterile mixture was pumped from the aseptic tank to the aseptic filling machine and filled into cartons.

The sterile liquid product had the following approximate composition: protein 7.2%, fat 4.6%, carbohydrates 21% and ash 0.8%. Whey protein in the product accounted for about 46% of the total protein (including egg protein).

Example 3

An acid phase was produced by dissolving 88 g/kg of acid whey protein concentrate and 100 g/kg of sucrose in water, and adjusting the pH of the solution to 3.5. The dispersion was UHT sterilized as in Examples 1 and 2.

A neutral phase was prepared by dissolving 280 g/kg of sucrose with 380 g/kg skim milk and 225 g/kg cream. After dissolving 57 g/kg of skim milk powder in the mixture, 60 g/kg of pasteurized, liquid egg yolk was added. The liquid mix was UHT-sterilized as described in Examples 1 and 2 and the neutral phase was subjected to a single stage homogenization at 70–78° C.

The acid and neutral phases were combined in a sterile tank in weight proportions of 1:1.43, prior to filling of the mixture in the aseptic filling machine.

The resulting sterile product had the following proximate composition: protein 5.8%, fat 5.6%, carbohydrates 20% and minerals 0.6%. Whey protein accounted for 54% of the total protein (including egg yolk).

The present invention is not to be limited in scope by the specific embodiments and/or examples described herein, which are intended as single illustrations of individual aspects of the invention, and functionally equivalent methods and components are within the scope of the invention. Indeed, various modifications of the invention, in addition to those shown and described herein will become apparent to those skilled in the art from the foregoing description and accompanying drawings. Such modifications are intended to fall within the scope of the present invention.

What is claimed is:

1. A liquid, sterilized food composition consisting essentially of about 20 to 45% by weight of a milk, between about 10 to 20% by weight of egg, between about 10 to 20% by weight of cream, between about 15 to 30% by weight of a sweetener, and whey protein in an amount of about 4 to 10% by weight, wherein the composition is suitable for making heat-set gelled food products.

2. The composition of claim 1 wherein at least 10% by weight of the milk is skim milk, and the whey protein represents about 30 to 60% of the total protein.

3. The composition of claim 1, having a pH of between about 5 and 6 and including a sweetener.

4. The composition of claim 1, wherein the pH is between about 5.4 and 5.8 and the sweetener is a carbohydrate.

5. The composition of claim 4, wherein the sweetener is sucrose, lactose, maltodextrins, starch, or a combination thereof.

6. The composition of claim 1, having a solids content of between about 30 to 40%.

7. The composition of claim 1, obtained by a process which comprises:

preparing an acid phase comprising an acid, the whey protein and water;

preparing a neutral phase comprising a mixture of the milk, sugar, egg and cream components;

sterilizing the acid phase and neutral phase separately from one another; and combining the sterilized acid phase and the sterilized neutral phase to obtain the composition.

8. The composition according to claim 7, wherein the acid phase has a pH of between about 2 and 5.

9. The composition of claim 7, which further comprises adding to the neutral phase at least one of skim milk powder, an alternative source of milk protein, or a combination thereof as part of the milk component.

10. The composition of claim 7, further comprising sterilizing the acid phase and the neutral phase separately using sterilization temperatures in the range of about 135 to 150° C. and at holding times of between about 2 and 20 sec.

11. The composition of claim 7 further comprising aseptically combining and packaging the sterilized acid and neutral phases.

12. The composition of claim 7, wherein the acid and neutral phases are combined in a mass ratio of the acid phase to the neutral phase of between about 1:1 and 1:2.5.

13. The composition of claim 7, wherein the acid phase further comprises at least one sweetener of sucrose, lactose, a maltodextrin, starch, or a combination thereof.

14. A heat-set gelled food product comprising the food composition of claim 1.

15. A ready-to-use food product formed of the composition of claim 1.

16. A pudding comprising the food composition of claim 1.

17. The food composition of claim 1, wherein the composition is storable and remains edible at room temperature for at least 6 months.

18. The food composition of claim 1, wherein the food composition is formed from the combination of an acid phase and a neutral phase comprising the milk, egg, cream and sugar, wherein the acid phase to neutral phase mass ratio is about 1:1 to 1:2.5.

19. A heat-set-gellable, ready-to-use food composition comprising:

about 20 to 45% by weight of a milk;

between about 10 to 20% by weight of egg;

between about 10 to 20% by weight of cream;

between about 15 to 30% by weight of a sweetener; and whey protein present in an amount sufficient to gel the food composition, wherein the composition is liquid and sterilized.

20. The food composition of claim 19, wherein the whey protein is present in an amount of about 4 to 10 weight percent of the composition.

\* \* \* \* \*